United States Patent
Moroga et al.

(10) Patent No.: US 11,374,616 B2
(45) Date of Patent: Jun. 28, 2022

(54) USER TERMINAL AND RADIO COMMUNICATION METHOD

(71) Applicant: NTT DOCOMO, INC., Tokyo (JP)

(72) Inventors: Hideyuki Moroga, Tokyo (JP); Satoshi Nagata, Tokyo (JP); Yuichi Kakishima, Palo Alto, CA (US)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/975,748

(22) PCT Filed: Feb. 26, 2019

(86) PCT No.: PCT/JP2019/007300
§ 371 (c)(1),
(2) Date: Aug. 26, 2020

(87) PCT Pub. No.: WO2019/167939
PCT Pub. Date: Sep. 6, 2019

(65) Prior Publication Data
US 2020/0412406 A1   Dec. 31, 2020

(30) Foreign Application Priority Data
Feb. 28, 2018  (JP) ............................. JP2018-050163

(51) Int. Cl.
*H04B 7/0452*  (2017.01)
*H04B 1/713*  (2011.01)
(Continued)

(52) U.S. Cl.
CPC ........... *H04B 1/713* (2013.01); *H04L 5/0048* (2013.01); *H04L 27/2649* (2013.01); *H04W 72/0453* (2013.01); *H04B 7/0452* (2013.01)

(58) Field of Classification Search
CPC ........... H04W 72/042; H04W 72/0446; H04W 72/0413; H04W 72/0453; H04W 72/14;
(Continued)

(56) References Cited

U.S. PATENT DOCUMENTS

2018/0124815 A1*  5/2018  Papasakellariou ........................... H04W 72/0446
2019/0052422 A1*  2/2019  Yin ........................ H04L 5/005
(Continued)

OTHER PUBLICATIONS

3GPP TS 36.300 V8.12.0 "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)" Mar. 2010 (149 pages).
3GPP TSG RAN WG1 AH-1801 Meeting; R1-1800666 "Remaining details on DM-RS" NTT DOCOMO, Inc.; Vancouver, Canada; Jan. 22-26, 2018 (16 pages).
(Continued)

*Primary Examiner* — Eva Y Puente
(74) *Attorney, Agent, or Firm* — Osha Bergman Watanabe & Burton LLP

(57) ABSTRACT

A terminal is disclosed including a transmitter that transmits an uplink shared channel; and a processor that determines, when frequency hopping is applied to the uplink shared channel, a symbol for a demodulation reference signal of the uplink shared channel based on a mapping type of the uplink shared channel by using a start symbol of each hop as a reference point. In other aspects, a radio communication method is also disclosed.

9 Claims, 10 Drawing Sheets

(51) Int. Cl.
*H04L 5/00* (2006.01)
*H04L 27/26* (2006.01)
*H04W 72/04* (2009.01)

(58) Field of Classification Search
CPC ......... H04W 72/1268; H04W 72/1289; H04W 74/0833; H04W 52/146; H04W 76/27; H04W 72/04; H04W 72/044; H04L 5/0051; H04L 5/0053; H04L 5/0055; H04L 5/0048; H04L 5/0012; H04L 5/0094; H04L 5/0007; H04L 1/1812; H04L 5/0044; H04L 1/1819; H04L 1/1896; H04L 5/001; H04B 7/0452; H04B 7/0848; H04B 17/336; H04B 1/7143; H04B 7/0626; H04B 1/713; H04B 7/06; H04B 1/1027; H04B 1/1036; H04B 2001/1045; H04B 7/0617; H04B 7/0413; H04B 7/0417
USPC ............................................................ 370/329
See application file for complete search history.

(56) References Cited

U.S. PATENT DOCUMENTS

2019/0349023 A1\* 11/2019 Ge .............................. H04L 5/10
2020/0146032 A1\* 5/2020 Bae ....................... H04L 27/2607
2021/0037519 A1\* 2/2021 Matsumura ........... H04L 5/0012

OTHER PUBLICATIONS

3GPP TSG RAN WG1 Meeting #92; R1-1802476 "Remaining details on DM-RS" NTT DOCOMO, Inc.; Athens, Greece; Feb. 26-Mar. 2, 2018 (8 pages).
International Search Report issued in International Application No. PCT/JP2019/007300, dated May 14, 2019 (4 pages).
Written Opinion issued in International Application No. PCT/JP2019/007300; dated May 14, 2019 (3 pages).
3GPP TSG RAN WG1 Meeting #92; R1-1803323 "Summary of Issues for PDSCH/PUSCH's DM-RS" Qualcomm Athens, Greece; Feb. 26-Mar. 2, 2018 (16 pages).
Extended European Search Report issued in European Application No. 19761271.6, dated Oct. 22, 2021 (8 pages).

\* cited by examiner

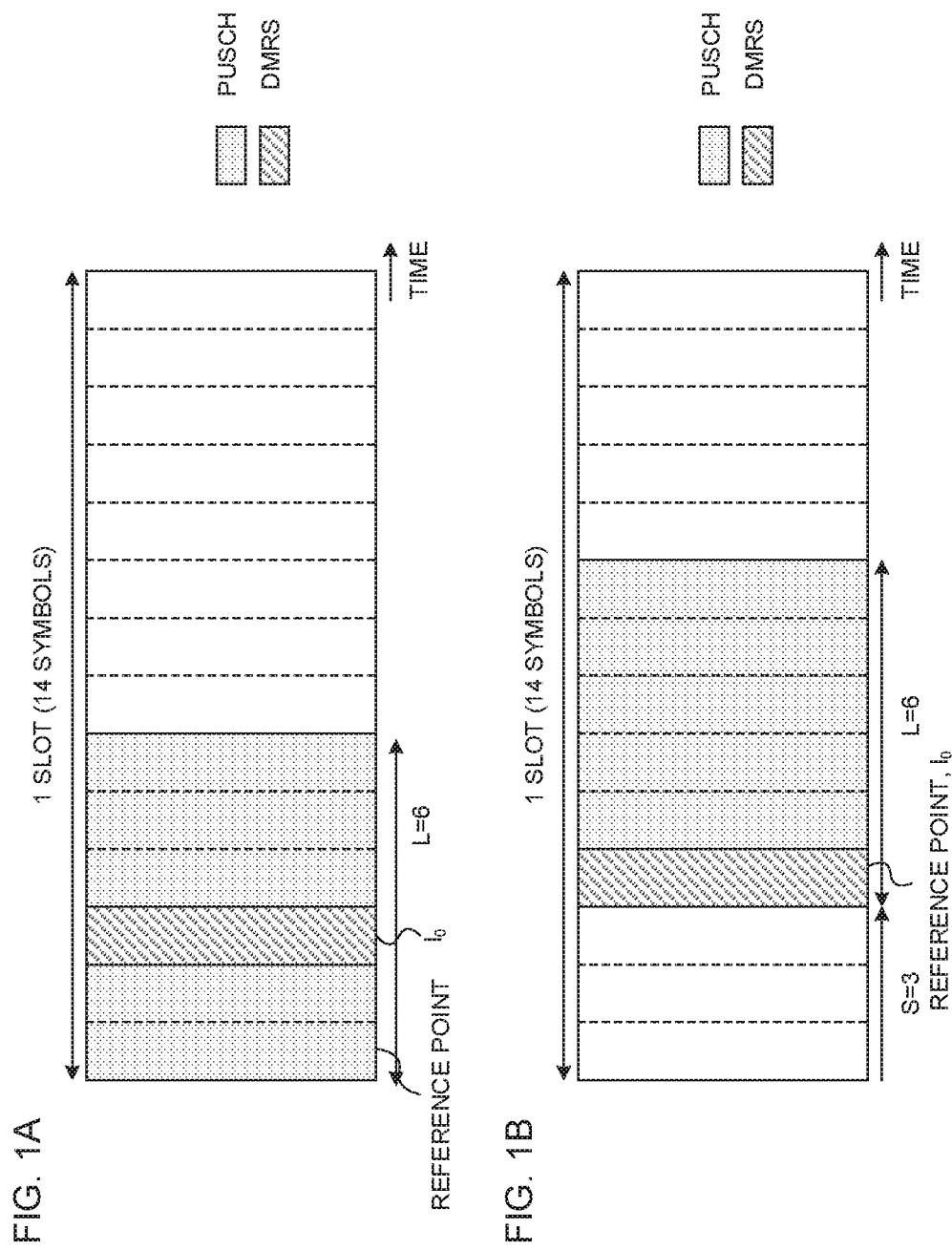

- for PUSCH mapping type A:
  - $l$ is defined relative to the start of the slot when frequency hopping flag is disabled. Otherwise, is defined relative to the start of the hop.
    - $l_0 = [2 \text{ or } 3]$
- for PUSCH mapping type B:
  - $l$ is defined relative to the start of the scheduled PUSCH resources when frequency hopping flag is disabled. Otherwise, is defined relative to the start of the hop.
    - $l_0 = 0$

FIG. 4

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). In addition, the specifications of LTE-A (LTE advanced and LTE Rel. 10, 11, 12 and 13) have also been drafted for the purpose of achieving increased capacity and enhancement beyond LTE (LTE Rel. 8 and 9).

Successor systems of LTE are also under study (for example, referred to as "FRA (Future Radio Access)," "5G (5th Generation mobile communication system)," "5G-F (plus)," "NR (New Radio)," "NX (New radio access)," "FX (Future generation radio access)," "LTE Rel. 14 or 15 and later versions," etc.).

In existing LTE systems (for example, LTE Rel. 8 to 13), downlink (DL) and/or uplink (UL) communications are carried out by using 1-ms subframes (also referred to as "transmission time intervals (TTIs)," and the like). A subframe is the unit of time for transmitting 1 channel-encoded data packet, and serves as the unit of processing in, for example, scheduling, link adaptation, retransmission control (HARQ (Hybrid Automatic Repeat reQuest)) and so on.

Furthermore, a radio base station (for example, an eNB (eNode B)) controls the allocation (scheduling) of data for user terminals (UE (User Equipment)), and sends data scheduling commands to the UEs by using downlink control information (DCI). For example, when a UE that conforms to existing LTE (for example, LTE Rel. 8 to 13) receives DCI that commands UL transmission (also referred to as a "UL grant"), the UE transmits UL data in a subframe that is located a certain period later (for example, 4 ms later).

CITATION LIST

Non-Patent Literature

Non-Patent Literature 1: 3GPP TS36.300 V8.12.0 "Evolved Universal Terrestrial Radio Access (E-UTRA) and Evolved Universal Terrestrial Radio Access Network (E-UTRAN); Overall Description; Stage 2 (Release 8)," April, 2010

SUMMARY OF INVENTION

Technical Problem

Envisaging future radio communication systems (for example, NR), research is underway to support frequency hopping of UL channels (which may be referred to as, for example, a "UL shared channel (PUSCH (Physical Uplink Shared CHannel))," a "UL control channel (PUCCH (Physical Uplink Control CHannel))" or "uplink signal" and so forth) to achieve a frequency diversity gain.

However, when applying frequency hopping to a UL channel, there is a possibility that the demodulation reference signal (DMRS (DeModulation Reference Signal)) for the UL channel cannot be allocated properly, and, as a result of this, the UL channel cannot be demodulated properly.

It is therefore an object of the present disclosure to provide a user terminal and a radio communication method, whereby, when frequency hopping is applied to a UL channel, the DMRS for the UL channel can be allocated properly.

Solution to Problem

According to one aspect of the present disclosure, a user terminal has a transmitting section that transmits an uplink shared channel, and a control section that determines, when frequency hopping is applied to the uplink shared channel, a symbol for a demodulation reference signal of the uplink shared channel based on a mapping type of the uplink shared channel, by using a start symbol of each hop as a reference point.

Advantageous Effects of Invention

According to the present invention, when applying frequency hopping to a UL channel, a user terminal can allocate the DMRS for the UL channel properly.

BRIEF DESCRIPTION OF DRAWINGS

FIGS. 1A and 1B are diagrams to explain the types of PUSCH mapping;

FIG. 4 is a diagram to show an example of the operation of a user terminal according to a third example of the present invention;

DESCRIPTION OF EMBODIMENTS

Figure 2A:
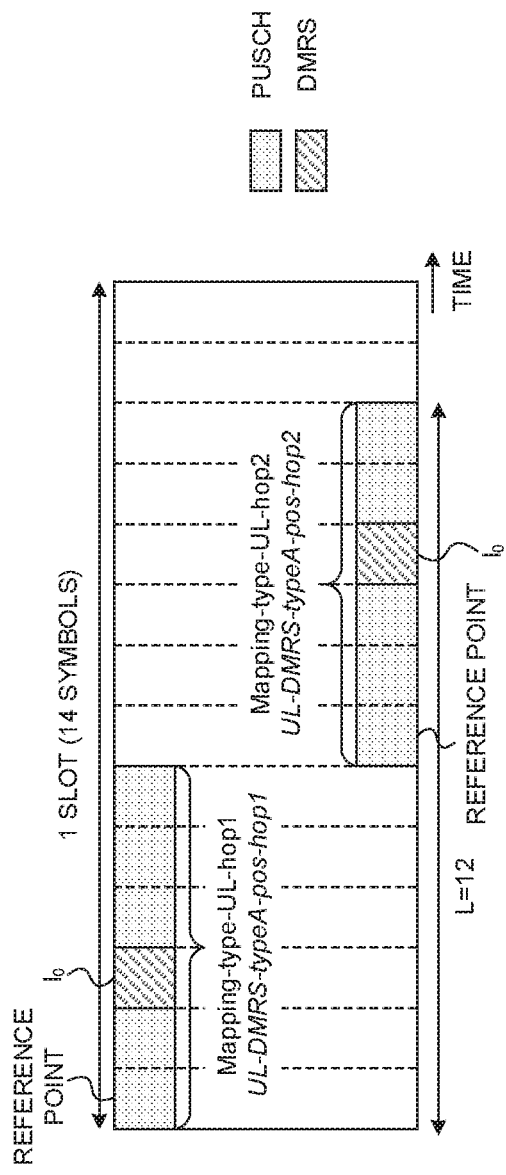
FIGS. 2A and 2B are diagrams to show examples of allocation types and control of DMRS symbols according to a first example of the present invention.

Envisaging future radio communication systems (for example, LTE Rel. 14, 15 or later versions, 5G, NR, and so forth, hereinafter collectively referred to as "NR"), studies are underway to transmit data and the like by using slot-based scheduling and minislot-based scheduling.

A slot is 1 basic unit of transmission (basic transmission unit), and 1 slot is comprised of a certain number of symbols. For example, in the event normal CPs are used, a slot interval is comprised of the first number of symbols (for example, 14 symbols), and, in the event extended CPs are used, a slot interval is comprised of a second number of symbols (for example, 12 symbols).

A mini slot corresponds to an interval that is comprised of by a number of symbols equal to or less than a certain value (for example, 14 symbols (or 12 symbols)). For example, in DL transmission (for example, PDSCH transmission) a minislot may be comprised of a certain number of symbols (the number of symbols being, for example, 2, 4 or 7).

Slot-based scheduling (type A) and minislot-based scheduling (type B) may be configured to adopt different resource allocation methods.

For example, assume a case where slot-based scheduling (also referred to as "PUSCH mapping type A") is applied to UL (for example, PUSCH transmission). In this case, the starting position of PUSCH in a slot is selected from among fixed symbols, which are configured in advance (including, for example, symbol index #0), and the number of symbols to which the PUSCH is allocated (PUSCH length) is selected from the range from a certain value (Y) to 14 (see FIG. 1A).

FIG. 1A shows a case where a PUSCH is allocated from the first symbol of the slot to the fourth symbol (symbols #0 to #3). In this way, in PUSCH mapping type A, although the PUSCH starting position is fixed, the length of the PUSCH (here, L=6) is configured in a flexible manner. Note that Y may be a greater value than 1 (Y>1), or may be 1 or more.

In type A, the demodulation reference signal (DM-RS) for use for demodulating the PUSCH is allocated to one or more symbols (DMRS symbols). The first DMRS symbol ($l_0$) may be indicated by a higher layer parameter (for example, UL-DMRS-type A-pos). For example, this higher layer parameter may indicate whether $l_0$ is 2 or 3 (which may indicate whether the first DMRS symbol corresponds to symbol index 2 or 3).

Also, in the event type A is used, DMRSs may be allocated to one or more additional symbols, apart from the first DMRS symbol ($l_0$). The locations and/or the number of these additional DMRS symbols may be indicated by at least one of a higher layer parameter (for example, DMRS-add-pos) and the duration (the number of symbols) of the PUSCH.

Also, in the event type A is used, the location l of a DMRS symbol in the time direction may be defined relative to the start symbol (symbol #0) of the slot (reference point).

For example, assume a case in which minislot-based scheduling (also referred to as "PUSCH mapping type B") is applied to UL (for example, PUSCH transmission). In this case, the number of symbols to which the PUSCH is allocated (PUSCH length) is selected from the numbers of candidate symbols that are configured in advance (the number of symbols 1 to 14), and the starting position of the PUSCH in the slot is configured somewhere (symbol) in the slot (see FIG. 1B).

FIG. 1B shows a case where the start symbol of the PUSCH is a certain symbol (here, symbol #3 (S=3)) and where the number of symbols allocated in a row from the start symbol is 4 (L=6). In this way, in the event PUSCH mapping type B is used, the start symbol (S) of the PUSCH and the number (L) of symbols that continue from the start symbol are reported from the base station to the UE. The number (L) of symbols that continue from the start symbol is also referred to as "PUSCH length." In this way, in the event PUSCH mapping type B is used, the PUSCH starting position is configured in a flexible manner.

In type B, the DM-RS for use for demodulating the PUSCH is allocated to one or more symbols (DMRS). The first DMRS symbol ($l_0$) for the DMRS may be a fixed symbol. For example, the first DMRS symbol may be equal to the PUSCH start symbol ($l_0$ may be 0).

Also, in the event type B is used, DMRSs may be allocated to one or more additional symbols apart from the first DMRS symbol ($l_0$). The locations and/or the number of these additional DMRS symbols may be indicated by at least one of a higher layer parameter (for example, DMRS-add-pos) and the duration (the number of symbols) of the PUSCH.

Also, in the event type B is used, the location l of a DMRS symbol in the time direction may be defined relative to the start symbol (symbol #3 in FIG. 1B) of the slot (reference point).

Information (S) to indicate the start symbol of data (for example, PUSCH) and information (L) to indicate the length of the data (or information about the combination/set of S and L) may be reported from the radio base station to the user terminal. In this case, the radio base station may configure a number of candidates (entries) combining the start symbol (S) and the data length (L), in the user terminal, in advance, by way of higher layer signaling, and may report information to specify particular candidates in downlink control information to the user terminal. Note that, in type B, 105 combinations of PUSCH lengths and starting positions are assumed.

Also, which mapping type applies to the PUSCH may be configured by, way of higher layer signaling (for example, RRC signaling), or may be reported by DCI, or may be determined by the combination of both.

Now, for NR, studies are in progress to apply frequency hopping to a PUSCH in order to achieve a frequency diversity gain. However, when frequency hopping is applied to a PUSCH, there is a possibility that the DMRS for the PUSCH cannot be allocated properly, and, as a result of this, this PUSCH DMRS cannot be not demodulated properly. Also, similar problems might also arise when applying frequency hopping to a PUCCH.

So, presuming the case where frequency hopping is applied to a UL channel, the present inventors have come up with the idea of selecting the symbol for the DMRS (DMRS symbol) for this UL channel per hop, or selecting common symbols between hops, based on what allocation type (for example, above type A or type B) applies to the UL channel in the time direction.

Now, embodiments of the present invention will be described below in detail with reference to the accompanying drawings. In the following, the case of applying frequency hopping to a PUSCH will be primarily described, but the present embodiment is suitably applicable to the case of applying frequency hopping to a PUCCH as well.

In the following, intra-slot frequency hopping, in which frequency hopping is used within 1 slot, will be described as an example, but inter-slot frequency, hopping, in which frequency hopping is used across a number of slots, may be used as appropriate.

First Example

With a first example of the present invention, an example will be described below, in which a user terminal controls PUSCH DMRS symbols, per hop, based on the type of allocation for the PUSCH in the time direction (for example, type A or type B above).

In the first example, the user terminal receives type information (also referred to as "first type information," "hop-specific type information," etc.), which indicates the type of allocation per hop (for example, either above-mentioned type A or type B). For example, when 2-hop frequency hopping is applied to a PUSCH, the user terminal may receive information to indicate the first-hop allocation type (type information for the first hop (Mapping-type-UL-hop1)) and information to indicate the second-hop allocation type (type information for the second hop (Mapping-type-UL-hop2)).

The user terminal may determine the PUSCH allocation type (for example, type A or type B above), per hop, based on the type information for each hop.

Also, according to the first example, the user terminal may receive position information, which indicates the position of the DMRS per hop (also referred to as "first position information," "hop-specific position information," etc.). For example, when 2-hop frequency hopping is applied to a PUSCH, the user terminal may receive information that indicates the position of the first-hop DMRS (position information for the first hop (UL-DMRS-type A-pos-hop 1)) and information that indicates the position of the second-hop DMRS (position information for the second hop (UL-DMRS-type A-pos-hop 2)).

The position information corresponding to each hop may indicate whether $l_0$ of each hop is 2 or 3 (or indicate whether the first DMRS symbol corresponds to symbol index 2 or 3). Note that the symbol indices may be assigned based on the reference point (in ascending order from symbol index 0 being the reference point).

When the type of allocation is one in which the start symbol of the PUSCH is fixed (for example, above type A), the user terminal may select the DMRS symbol for each hop based on the position information corresponding to each hop.

The user terminal may receive at least one of the above hop-specific type information and the above hop-specific position information by way of higher layer signaling and/or physical layer signaling. Higher layer signaling may be, for example, one of RRC signaling, MAC signaling, broadcast information and so forth, or a combination of these. The broadcast information may include, for example, the master information block (MIB), a system information block (SIB), system information (RMSI (Remaining Minimum System Information and/or OSI (Other System Information)) and so on.

Figure 2B:
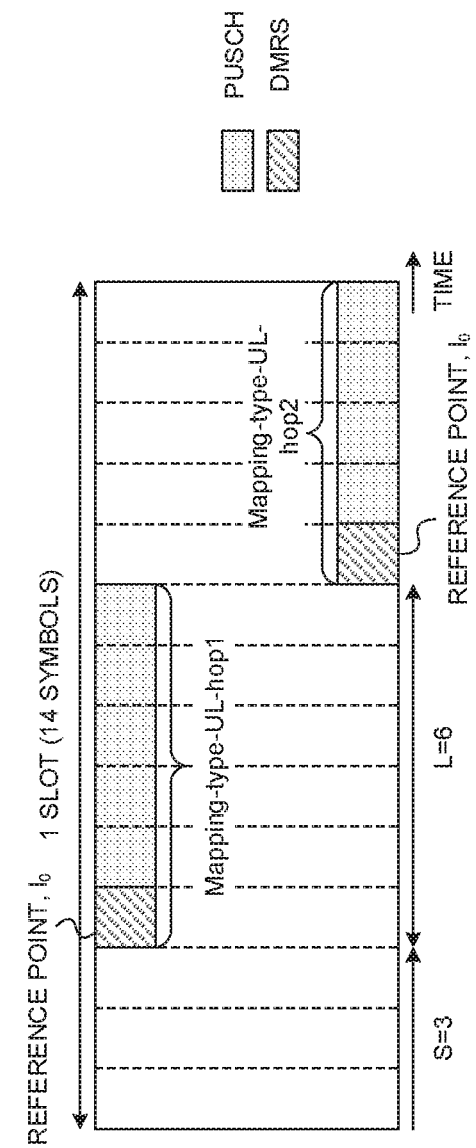

FIGS. 2A and 2B are diagrams to show examples of allocation types and control of DMRS symbols according to the first example. In FIG. 2A, an example of above type A is shown, and, in FIG. 2B, an example of above type B is shown.

As shown in FIGS. 2A and 2B, a user terminal may determine the type of allocation for the first hop and the second hop based on the type information for the first hop (Mapping-type-UL-hop1) and the type information for the second hop (Mapping-type-UL-hop2), respectively. Note that, although FIGS. 2A and 2B assume that the same allocation type is applied to the first hop and the second hop, but different allocation types may be applied to the first hop and the second hop as well.

As shown in FIG. 2A, in the event type A is used, a user terminal may select the first DMRS symbol based on the position information corresponding to each hop, by using each hop's start symbol as a reference point (symbol #0 and symbol index 0).

For example, in FIG. 2A, the position information for the first hop (UL-DMRS-typed-pos-hop1) indicates symbol index 2, and the position information for the second hop (UL-DMRS-typeA-pos-hop2) indicates symbol index 3. Therefore, the user terminal determines that symbol #2 is the first DMRS symbol ($l_0$) of the first hop, using the start symbol of the first hop as a reference point (symbol #0). Meanwhile, the user terminal determines that symbol #3 is the first DMRS symbol ($l_0$) of the second hop, using the start symbol of the second hop as a reference point (symbol #0).

Also, as shown in FIG. 2B, in the event type B is used, the user terminals may select the first DMRS symbol at a certain position (for example, symbol index 0), using each hop's start symbol as a reference point.

For example, in FIG. 2B, the user terminal determines that symbol 40 is the first DMRS symbol ($l_0$) of the first hop, using the start symbol of the first hop as a reference point (symbol #0). Similarly, the user terminal determines that symbol #0 is the first DMRS symbol ($l_0$) of the second hop, using the start symbol of the second hop as a reference point (symbol #0).

Note that, although not shown, in FIGS. 2A and 2B, additional DMRS symbols for each hop may also be selected based on a higher layer parameter (DMRS-add-pos), using the start symbol of each hop as a reference point (symbol #0). Note that the higher layer parameter (DMRS-add-pos) may be configured in the user terminal per hop.

According to the first example, the type of allocation for the PUSCH in the time direction (for example, type A or type B above) and/or the positions of DMRS symbols are controlled independently, per hop. Therefore, for example, the DMRS for PUSCH and the DMRS for PDSCH can be allocated in the same symbol more easily. As a result of this, pipeline demodulation can be achieved at ease, and the reliability of demodulation can be improved.

Second Example

With a second example of the present invention, an example will be described below, in which a user terminal controls the DMRS symbol for the PUSCH in common between hops based on the allocation type (for example, type A or type B above) in the time direction of the PUSCH.

In the second example, the user terminal receives type information (also referred to as "second type information," "common type information," etc.), which indicates the type of allocation in common between hops (for example, either above-mentioned type A or type B). For example, when 2-hop frequency hopping is applied to a PUSCH, the user terminal may receive information indicating an allocation type (mapping-type-UL) that applies in common to the first hop and the second hop.

The user terminal may determine the PUSCH allocation type (for example, type A or type B above) based on the above type information that is common between the hops.

Also, in the first example, the user terminal may receive position information (also referred to as "second position information," "common position information," etc.) that indicates a DMRS position that applies in common between hops. For example, when 2-hop frequency hopping is applied to a PUSCH, a user terminal may receive information (UL-DMRS-typed-pos) that indicates a common DMRS position for the first hop and the second hop.

The above common position information may indicate whether $l_0$ of each hop is 2 or 3 (which may indicate whether the first DMRS symbol corresponds to symbol index 2 or 3).

Note that the symbol indices may be assigned based on the reference point (in ascending order from symbol index 0 being the reference point).

When the type of allocation is one in which the start symbol of the PUSCH is fixed (for example, above type A), the user terminal may select the DMRS symbol for each hop based on the above common position information.

The user terminal may receive at least one of the above common type information and the above common position information by way of higher layer signaling and/or physical layer signaling. Higher layer signaling may be, for example, one of RRC signaling, MAC signaling, broadcast information and so forth, or a combination of these. The broadcast information may be, for example, the master information block (MIB), a system information block (SIB), system information (RMSI and/or OSI) and the like.

Figure 3A:
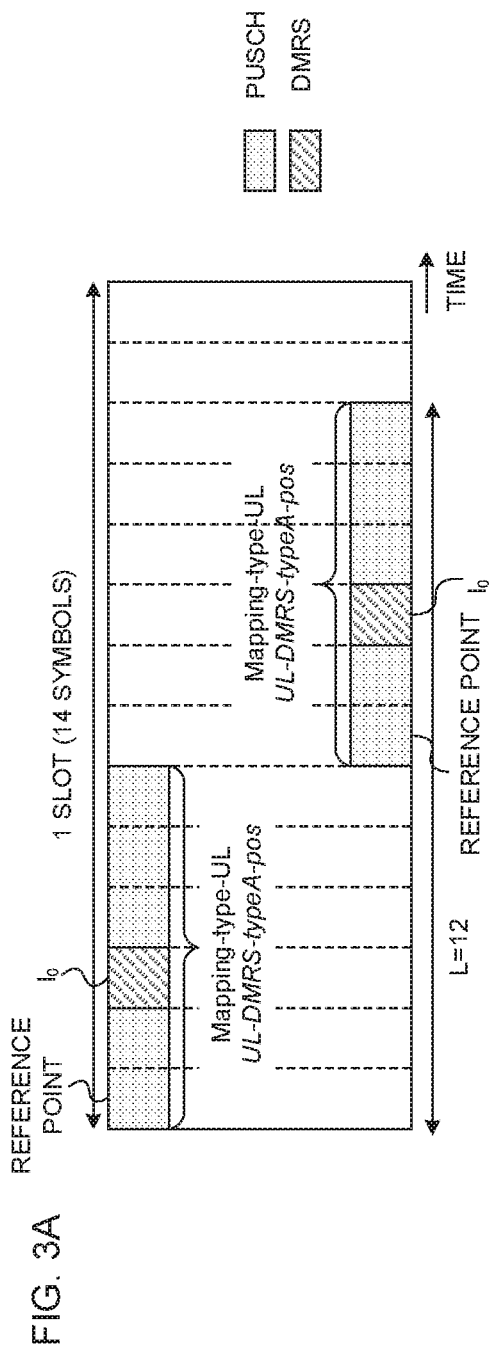
FIGS. 3A and 3B are diagrams to show examples of allocation types and control of DMRS symbols according to a second example of the present invention.
Figure 3B:
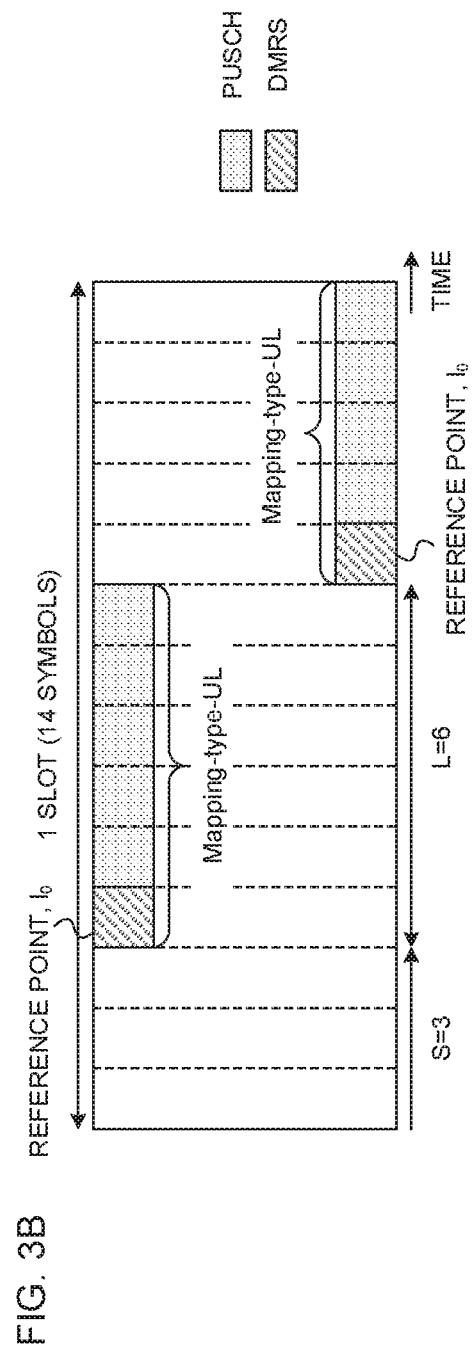

FIGS. 3A and 3B are diagrams to show examples of allocation types and control of DMRS symbols according to the second example. In FIG. 3A, an example of above type A is shown, and in FIG. 3B, an example of above type B is shown.

As shown in FIGS. 3A and 3B, the user terminal may determine the type of allocation for the first hop and the second hop based on the above common type information (Mapping-type-UL). In FIGS. 3A and 3B, the same allocation type is applied to the first hop and the second hop.

As shown in 3A, in the event type A is used, the user terminal may select the first DMRS symbol based on the above common position information (UL-DMRS-typeA-pos), by using each hop's start symbol as a reference point (symbol #0, symbol index 0).

For example, FIG. 3A assumes that the common position information (UL-DMRS-type A-pos) indicates symbol index 2. Therefore, the user terminal determines that symbol #2 is the first DMRS symbol ($l_0$) of the first hop using the start symbol of the first hop as a reference point (symbol #0). Therefore, the user terminal determines the first DMRS symbol ($l_0$) of the second hop to be symbol #2 using the start symbol of the second hop as a reference point (symbol #0).

Also, as shown in FIG. 3B, in the event type B is used, the user terminal may select a certain position as the first DMRS symbol (for example, symbol index 0), using each hop's start symbol as a reference point.

For example, in FIG. 3B, the user terminal determines symbol #0 is the first DMRS symbol of the first hop ($l_0$), using the start symbol of the first hop as a reference point (symbol #0). Likewise, the user terminal selects the first DMRS symbol ($l_0$) of the second hop to be symbol #2 using the start symbol of the second hop as a reference point (symbol #0).

Note that, although not shown, in FIGS. 3A and 3B, additional DMRS symbols for each hop may also be selected based on a higher layer parameter (DMRS-add-pos), using the start symbol of each hop as a reference point (symbol #0). Note that the higher layer parameter (DMRS-add-pos) may be configured in the user terminal for each hop.

According to the second example, the type of allocation for the PUSCH in the time direction (for example, type A or type B above) and/or the positions of DMRS symbols are controlled in common between hops. Consequently, overhead can be reduced compared to the case where the type information and/or position information is signaled from the radio base station to the user terminal on a per hop basis.

Third Example

With a third example of the present invention, the operation of a user terminal according to the first example or the second example described above will be primarily described. FIG. 4 is a diagram to show an example of the operation of the user terminal according to the third example.

As shown in FIG. 4, when a type in which the start symbol of the PUSCH is fixed (above-mentioned type A, PUSCH mapping type A, etc.) and frequency hopping is not applied to this PUSCH, l (also referred to as the "location of DMRS in the time direction," "DMRS symbol," etc.) may be defined relative to the beginning (also referred to as the "start symbol") of the slot as a reference point (symbol #0, symbol index 0, etc.). On the other hand, when frequency hopping is applied to the PUSCH, l may be defined relative to the beginning of each hop (also referred to as the "start symbol") as a reference point.

Also, in the event type A is used, $l_0$ (also referred to as the "first DMRS location in the time direction," the "first DMRS symbol," etc.) may be symbol #2 or #3. The symbols may be indexed based on a reference point (in ascending order from symbol #0 as a reference point).

As shown in FIG. 4, when a type in which the start symbol of the PUSCH is not fixed (above-mentioned type B, PUSCH mapping type B, etc.) and frequency hopping is not applied to this PUSCH, l (also referred to as the "location of DMRS in the time direction," "DMRS symbol," etc.) may be defined relative to the beginning (also referred to as the "start symbol") of the scheduled PUSCH resource being a reference point (symbol #0, symbol index 0, etc.). On the other hand, when frequency hopping is applied to the PUSCH, l may be defined relative to the beginning of each hop (also referred to as the "start symbol") as a reference point.

Also, in the event type B is used, $l_0$ (also referred to as the "first DMRS location in the time direction," the "first DMRS symbol," etc.) may be symbol #0. The symbols may be indexed based on a reference point (in ascending order from symbol #0 as a reference point).

Note that FIG. 4 can be applied to either the first example or the second example. According to the first example described above, type A or type B may be selected on a hop-by-hop basis, based on type information corresponding to each hop (for example, Mapping-type-UL-hop1 and Mapping-type-UL-hop2). Also, whether above $l_0$ is symbol #2 or #3 may be judged, per hop, based on position information corresponding to each hop (for example, UL-DMRS-type A-pos-hop1 and UL-DMRS-type A-pos-hop2).

On the other hand, according to the second example described above, type A or type B determination above may be made in common between hops based on the above common type information (for example, Mapping-type-UL-hop). Also, whether above $l_0$ is symbol #2 or #3 may be judged in common between hops based on the above common position information (for example, UL-DMRS-type A-pos).

(Radio Communication System)

Now, the structure of a radio communication system according to one embodiment of the present invention will be described below. In this radio communication system, communication is performed using one of the radio communication methods according to the herein-contained embodiments of the present invention, or a combination of these.

Figure 5:
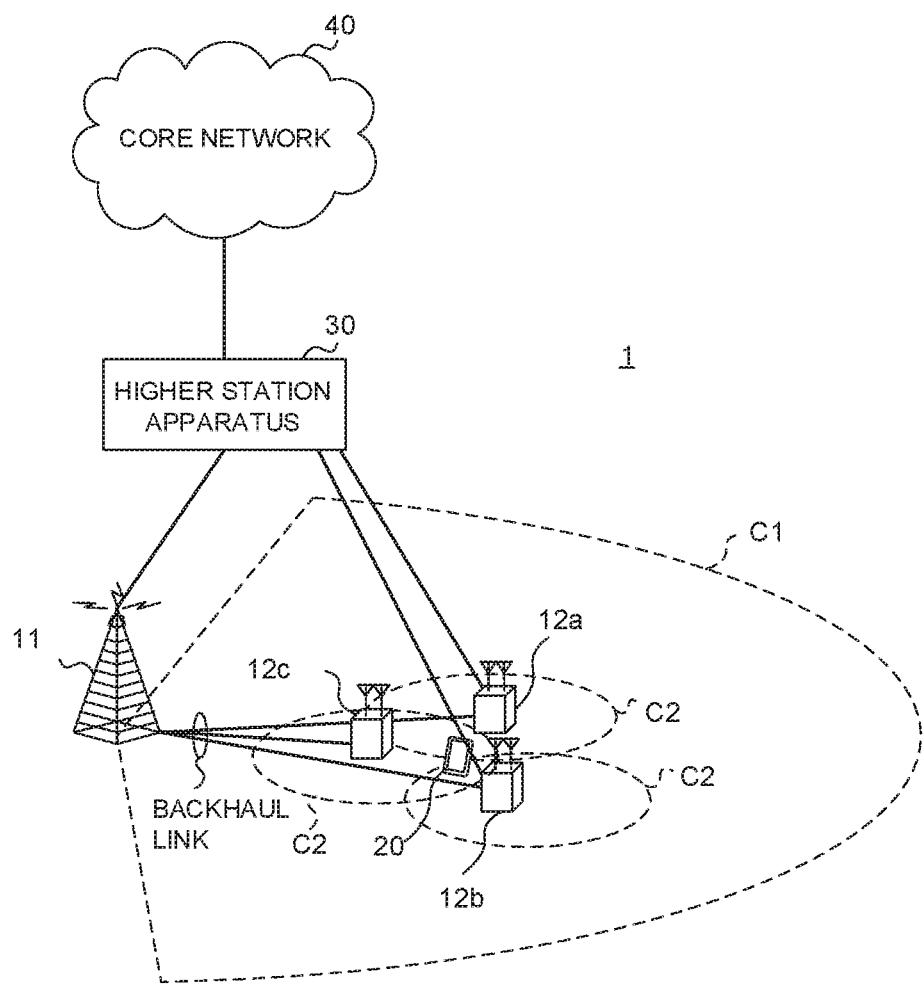
FIG. 5 is a diagram to show an exemplary schematic structure of a radio communication system according to one embodiment of the present invention.

FIG. 5 is a diagram to show an exemplary schematic structure of a radio communication system according to one embodiment of the present invention. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes 1 unit.

Note that the radio communication system 1 may be referred to as "UE (Long Term Evolution)," "LTE-A (LTE-Advanced)," "LTE-B (UE-Beyond)," "SUPER 3G," "IMT-Advanced," "4G (4th generation mobile communication system)," "5G (5th generation mobile communication system)," "NR (New Radio)," "FRA (Future Radio Access)," "New-RAT (Radio Access Technology)," and so on, or may be seen as a system to implement these.

The radio communication system 1 includes a radio base station 11 that forms a macro cell C1, and radio base stations 12 (12a to 12c) that are placed within the macro cell C1 and that form small cells C2, which are narrower than the macro cell C1. Also, user terminals 20 are placed in the macro cell C1 and in each small cell C2. The arrangement and number of cells and user terminals 20 are not limited to those illustrated in the drawing.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, five or fewer CCs or six or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

Furthermore, the user terminals 20 can communicate by using time division duplexing (TDD) and/or frequency division duplexing (FDD), in each cell. Furthermore, in each cell (carrier), a single numerology may be used, or a plurality of different numerologies may be used.

The radio base station 11 and a radio base station 12 (or 2 radio base stations 12) may be connected with each other by cables (for example, by optical fiber, which is in compliance with the CPRI (Common Public Radio Interface), the X2 interface and so on), or by radio.

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) and/or OFDMA are applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to these combinations, and other radio access schemes may be used as well.

In the radio communication system 1, a downlink shared channel (PDSCH (Physical Downlink Shared CHannel)), which is used by each user terminal 20 on a shared basis; a broadcast channel (PBCH (Physical Broadcast CHannel)), downlink L1/L2 control channels and so on are used as downlink channels. User data, higher layer control information, SIBs (System Information Blocks) and so on are communicated in the PDSCH. Also, the MIB (Master Information Blocks) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), which includes PDSCH and/or PUSCH scheduling information, is communicated by the PDCCH.

Note that scheduling information may be reported in DCI. For example, DCI to schedule receipt of data may be referred to as a "DL assignment," and DCI to schedule UL data transmission may also be referred to as a "UL grant."

The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACKs," "ACK/NACKs," etc.) in response to the PUSCH is transmitted by the PINCH. The EPDCCH is frequency-division-multiplexed with the PDSCH (downlink shared data channel) and used to communicate DCI and so on, like the PDCCH.

In the radio communication system 1, an uplink shared channel (PUSCH (Physical Uplink Shared CHannel)), which is used by each user terminal 20 on a shared basis, an uplink control channel (PUCCH (Physical Uplink Control CHannel), a random access channel (PRACH (Physical Random Access CHannel)) and so on are used as uplink channels. User data, higher layer control information and so on are communicated by the PUSCH. Also, in the PUCCH, downlink radio quality information (CQI (Channel Quality Indicator)), delivery acknowledgment information, scheduling requests (SRs) and so on are communicated. By means of the PRACH, random access preambles for establishing connections with cells are communicated.

In the radio communication system 1, cell-specific reference signals (CRSs), channel state information reference signals (CSI-RSs), demodulation reference signals (DMRSs), positioning reference signals (PRSs) and so on are communicated as downlink reference signals. Also, in the radio communication system 1, measurement reference signals (SRSs (Sounding Reference Signals)), demodulation reference signals (DMRSs) and so on are communicated as uplink reference signals. Note that the DMRSs may be referred to as "user terminal-specific reference signals (UE-specific reference signals)." Also, the reference signals to be communicated are by no means limited to these.

(Radio Base Station)

Figure 6:
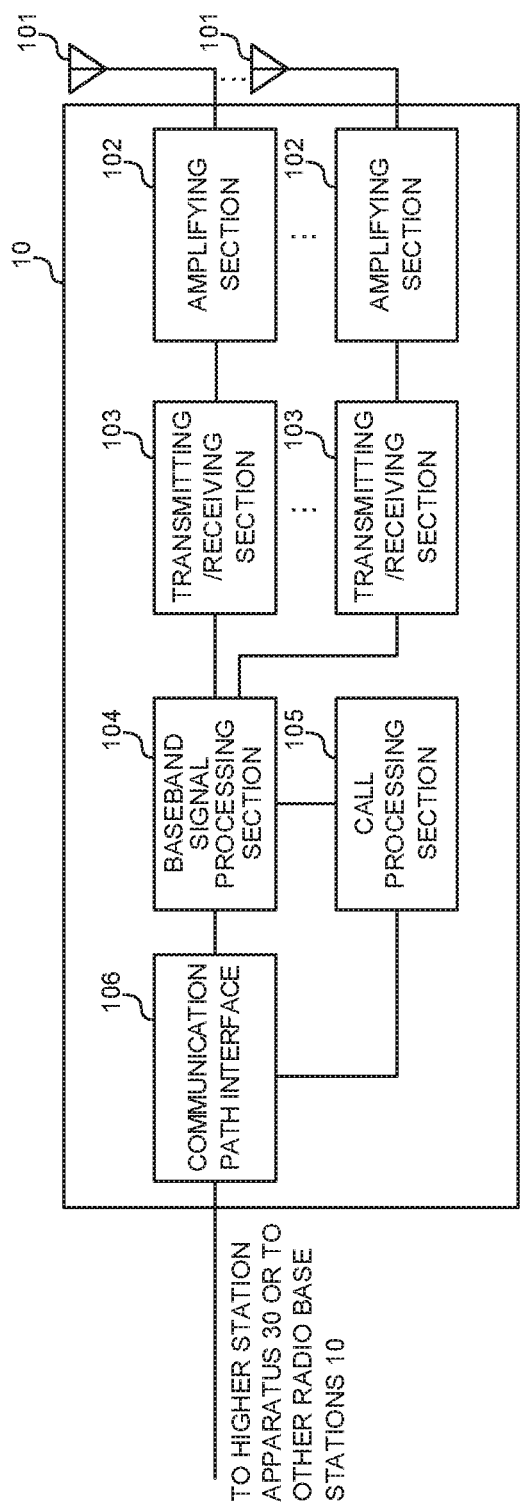
FIG. 6 is a diagram to show an exemplary overall structure of a radio base station according to one embodiment of the present invention.

FIG. 6 is a diagram to show an exemplary overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are pre-coded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FTT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a certain interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

The transmitting/receiving sections 103 also receive uplink signals (PUSCH and/or PUCCH) transmitted from the user terminal 20. Also, the transmitting/receiving sections 103 transmit at least one of information about the type of allocation (mapping type) of the uplink signal in the time direction, the start symbol of the uplink signal and the duration (the number of symbols) of the uplink signal.

Figure 7:
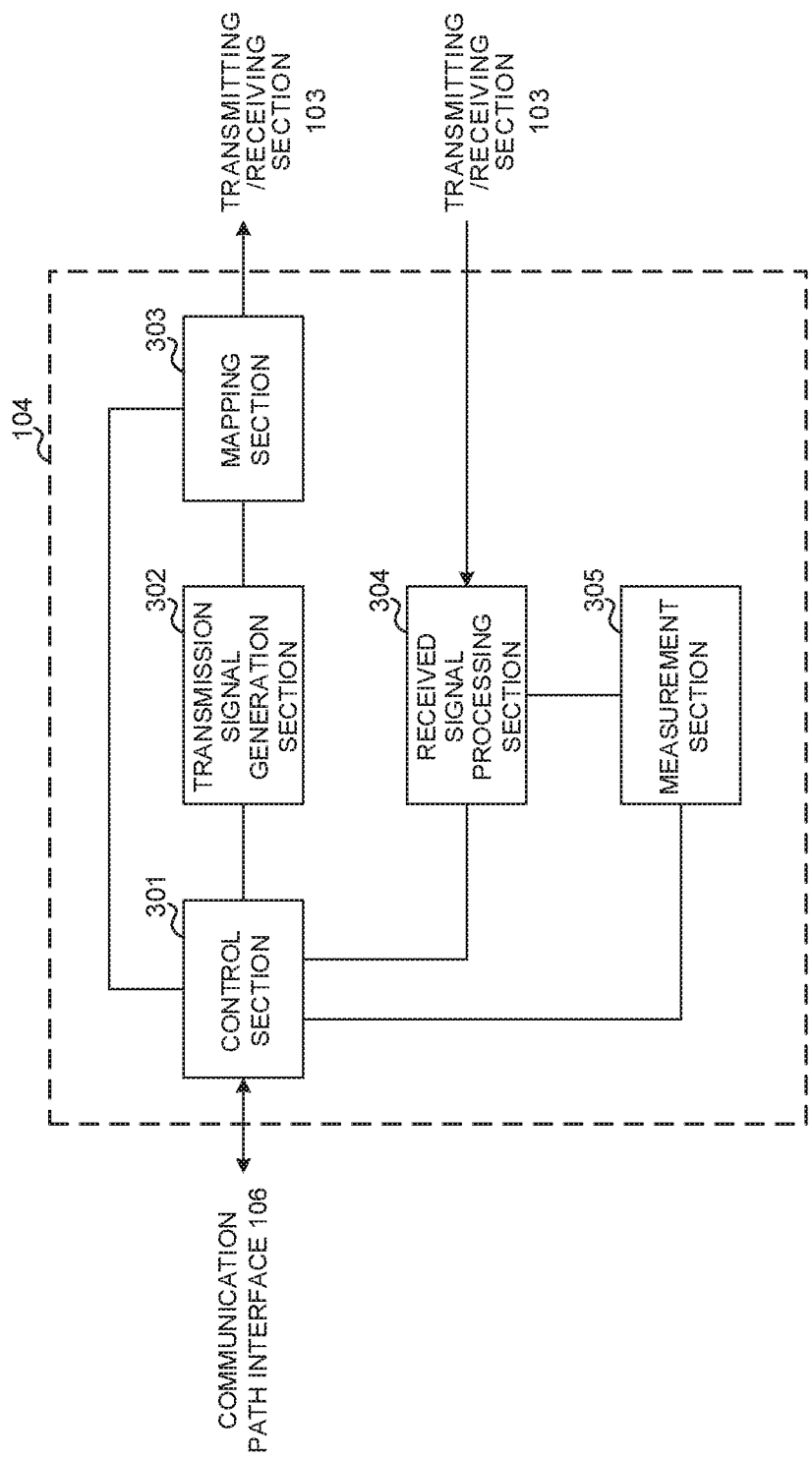
FIG. 7 is a diagram to show an exemplary functional structure of a radio base station according to one embodiment of the present invention.

FIG. 7 is a diagram to show an exemplary functional structure of a radio base station according to one embodiment of the present invention. Note that, although this example primarily shows functional blocks that pertain to characteristic parts of the present embodiment, the radio base station 10 has other functional blocks that are necessary for radio communication as well.

The baseband signal processing section 104 has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 301 controls, for example, generation of signals in the transmission signal generation section 302, allocation of signals in the mapping section 303, and so on. Furthermore, the control section 301 controls signal receiving processes in the received signal processing section 304, measurements of signals in the measurement section 305, and so on.

The control section 301 controls the scheduling (for example, resource allocation) of system information, downlink data signals (for example, signals transmitted in the PDSCH) and downlink control signals (for example, signals transmitted in the PDCCH and/or the EPDCCH, such as delivery acknowledgment information). Also, the control section 301 controls the generation of downlink control signals, downlink data signals and so on based on the results of deciding whether or not retransmission control is necessary in response to uplink data signals and so on. Also, the control section 301 controls the scheduling of synchronization signals (for example, PSS (Primary Synchronization Signal)/SSS (Secondary Synchronization Signal)), downlink reference signals (for example, CRSs, CSI-RSs, DMRSs and so on) and so on.

The control section 301 also controls the scheduling of uplink data signals (for example, signals transmitted in the PUSCH), uplink control signals (for example, signals transmitted in the PUCCH and/or the PUSCH, such as delivery acknowledgment information), random access preambles (for example, signals transmitted in the PRACH), and uplink reference signals.

The control section 301 also controls the frequency hopping of uplink signals (for example, PUCCH and/or PUSCH).

Also, the control section 301 may control generation and/or transmission of first type information, which indicates the type of allocation for each hop of an uplink signal (for example, PUCCH and/or PUSCH), or second type information, which indicates the type of allocation in common between hops.

The control section 301 may also control the generation and/or transmission of first position information to indicate the position of the DMRS of the uplink signal (for example, PUCCH and/or PUSCH) per hop, or second position information showing the position of the DMRS in common between hops.

The transmission signal generation section 302 generates downlink signals (downlink control signals, downlink data signals, downlink reference signals and so n) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink data allocation information, and/or UL grants, which report uplink data allocation information, based on commands from the control section 301. DL assignments and UL grants are both DCI, in compliance with DCI format. Also, the downlink data signals are subjected to the coding process, the modulation process and so on, by using coding rates and modulation schemes that are selected based on, for example, channel state information (CSI) from each user terminal 20.

The mapping section 303 maps the downlink signals generated in the transmission signal generation section 302 to certain radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminal 20 (uplink control signals, uplink data signals, uplink reference signals, etc.). For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes, to the control section 301. For example, when a PUCCH to contain an HARQ-ACK is received, the received signal processing section 304 outputs this HARQ-ACK to the control section 301. Also, the received signal processing section 304 outputs the received signals and/or the signals after the receiving processes to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

For example, the measurement section 305 may perform RRM (Radio Resource Management) measurements, CSI (Channel State Information) measurements and so on, based on the received signals. The measurement section 305 may measure the received power (for example, RSRP (Reference Signal Received Power)), the received quality (for example, RSRQ (Reference Signal Received Quality), SINR (Signal to Interference plus Noise Ratio), etc.), SNR (Signal to Noise Ratio), the signal strength (for example, RSSI (Received Signal Strength Indicator)), transmission path information (for example, CSI) and so on. The measurement results may be output to the control section 301.

(User Terminal)

Figure 8:
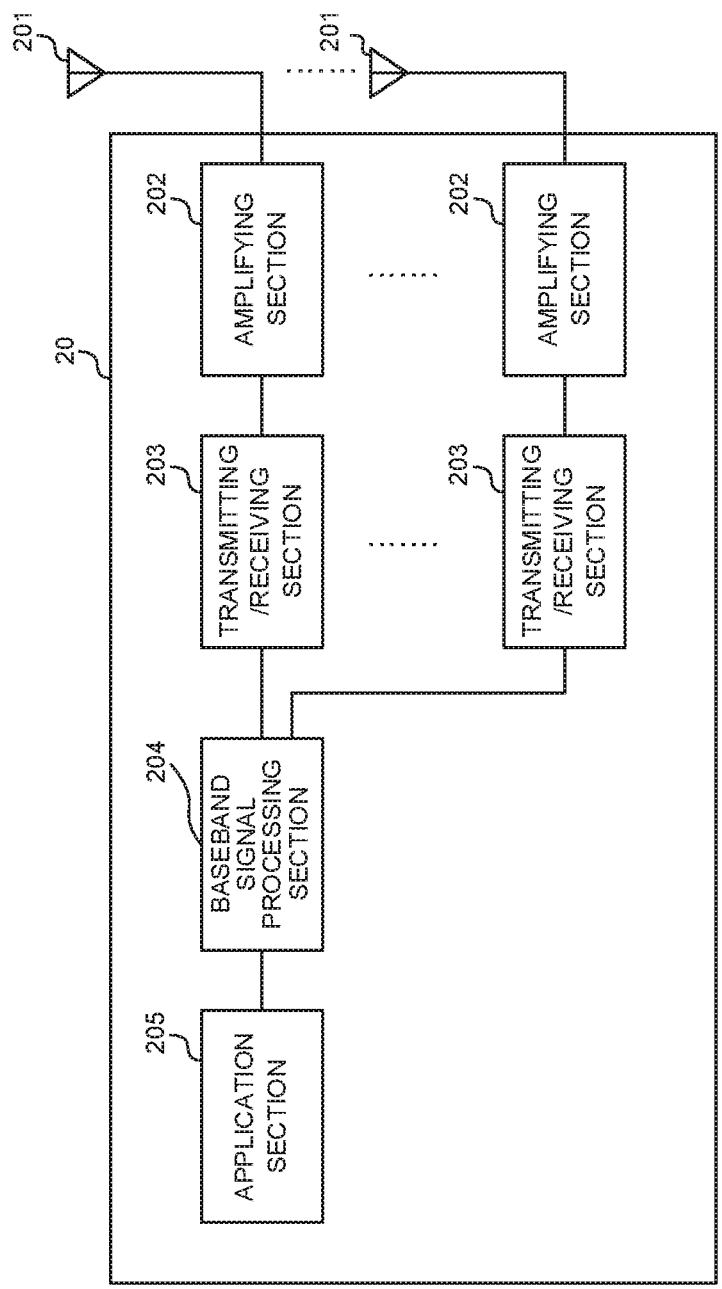
FIG. 8 is a diagram to show an exemplary overall structure of a user terminal according to one embodiment of the present invention.

FIG. 8 is a diagram to show an exemplary overall structure of a user terminal according to one embodiment of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

The baseband signal processing section 204 performs receiving processes for the baseband signal that is input, including an FFT process, error correction decoding, a retransmission control receiving process and so on. Downlink user data is forwarded to the application section 205. The application section 205 performs processes related to higher layers above the physical layer and the MAC layer, and so on. In the downlink data, the broadcast information can be also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, preceding, a discrete Fourier transform (DFT) process, an IFFT process and so on, and the result is forwarded to the transmitting/receiving sections 203. The baseband signal that is output from the baseband signal processing section 204 is converted into a radio frequency band in the transmitting/ receiving sections 203. The radio frequency signals that are subjected to frequency conversion in the transmitting/receiving sections 203 are amplified in the amplifying sections 202, and transmitted from the transmitting/receiving antennas 201.

Also, the transmitting/receiving sections 203 transmit an uplink signal (PUSCH and/or PUCCH) transmitted from the user terminal 20. Also, the transmitting/receiving sections 203 receive at least one of information about the type of allocation (mapping type) of the uplink signal in the time direction, the start symbol of the uplink signal and the duration (the number of symbols) of the uplink signal.

Also, the transmitting/receiving sections 203 may receive first type information, which shows the type of allocation per hop or second type information, which shows a type of allocation that applies in common between hops. Also, the transmitting/receiving sections 203 may receive first position information, which shows the position of the above demodulation reference signal for each hop or second position information, which shows the position of the above demodulation reference signal in common between hops.

Figure 9:
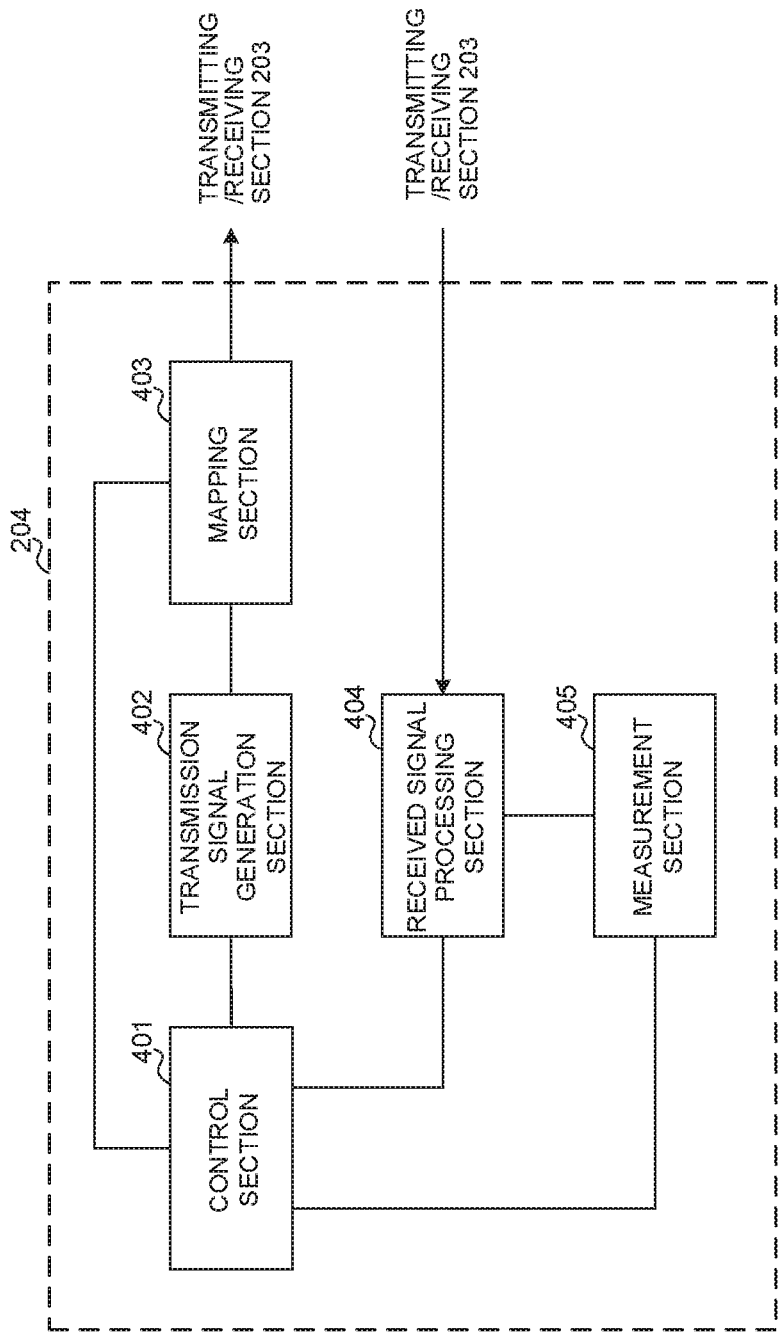
FIG. 9 is a diagram to show an exemplary functional structure of a user terminal according to one embodiment of the present invention.

FIG. 9 is a diagram to show an exemplary functional structure of a user terminal according to one embodiment of the present invention. Note that, although this example primarily shows functional blocks that pertain to characteristic parts of the present embodiment, the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. For the control section 401, a controller, a control circuit or control apparatus that can be described based on general understanding of the technical field to which the present invention pertains can be used.

The control section 401 controls, for example, generation of signals in the transmission signal generation section 402, allocation of signals in the mapping section 403, and so on. Furthermore, the control section 401 controls signal receiving processes in the received signal processing section 404, measurements of signals in the measurement section 405, and so on.

The control section 401 acquires the downlink control signals and downlink data signals transmitted from the radio base station 10, via the received signal processing section 404. The control section 401 controls the generation of uplink control signals and/or uplink data signals based on the results of deciding whether or not retransmission control is necessary for the downlink control signals and/or downlink data signals, and so on.

When frequency hopping is applied to an uplink signal (for example, PUSCH and/or PUCCH), the control section 401 may determine the DMRS symbol of the uplink signal (the symbol for the demodulation reference signal), per hop, or in common between hops, based on the allocation type of the uplink signal in the time direction.

The control section 401 may determine the above type of allocation, per hop, or in common between hops, based on the first type information or the second type information.

If the allocation type is one in which the start symbol of the uplink signal (PUSCH and/or PUCCH) is fixed (type A), the control section 401 may determine the DMRS symbol on a hop-by-hop basis or in common between hops based on the first position information or the second position information.

The control section 401 may determine the DMRS symbol using each hop's start symbol as a reference point, if the allocation type is one in which the start symbol of the uplink signal (PUSCH and/or PUCCH) is fixed (type A).

The control section 401 may determine the DMRS symbols using each hop's start symbol as a reference point, if the allocation type is one in which the start symbol of the uplink signal (PUSCH and/or PUCCH) is not fixed (type B).

The transmission signal generation section 402 generates uplink signals (uplink control signals, uplink data signals, uplink reference signals, etc.) based on commands from the control section 401, and outputs these signals to the mapping section 403. The transmission signal generation section 402 can be constituted by a signal generator, a signal generating circuit or signal generation apparatus that can be described based on general understanding of the technical field to which the present invention pertains.

For example, the transmission information generation section 402 generates uplink control signals such as delivery acknowledgement information, channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and output the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs the decoded information acquired through the receiving processes, to the control section 401. The received signal processing section 404 outputs, for example, broadcast information, system information, RRC signaling, DCI and so on, to the control section 401. Also, the received signal processing section 404 outputs the received signals and/or the signals after the receiving processes to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

For example, the measurement section 405 may perform RRM measurements, CSI measurements, and so on, based on the received signals. The measurement section 405 may measure the received power (for example, RSRP), the received quality (for example, RSRQ, SINR, SNR, etc.), the signal strength (for example, RSSI), transmission path information (for example, CSI) and so on. The measurement results may be output to the control section 401.

(Hardware Structure)

Note that the block diagrams that have been used to describe the above embodiments show blocks in functional units. These functional blocks (components) may be implemented in arbitrary combinations of hardware and/or software. Also, the method for implementing each functional block is not particularly limited. That is, each functional block may be realized by 1 piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 10:
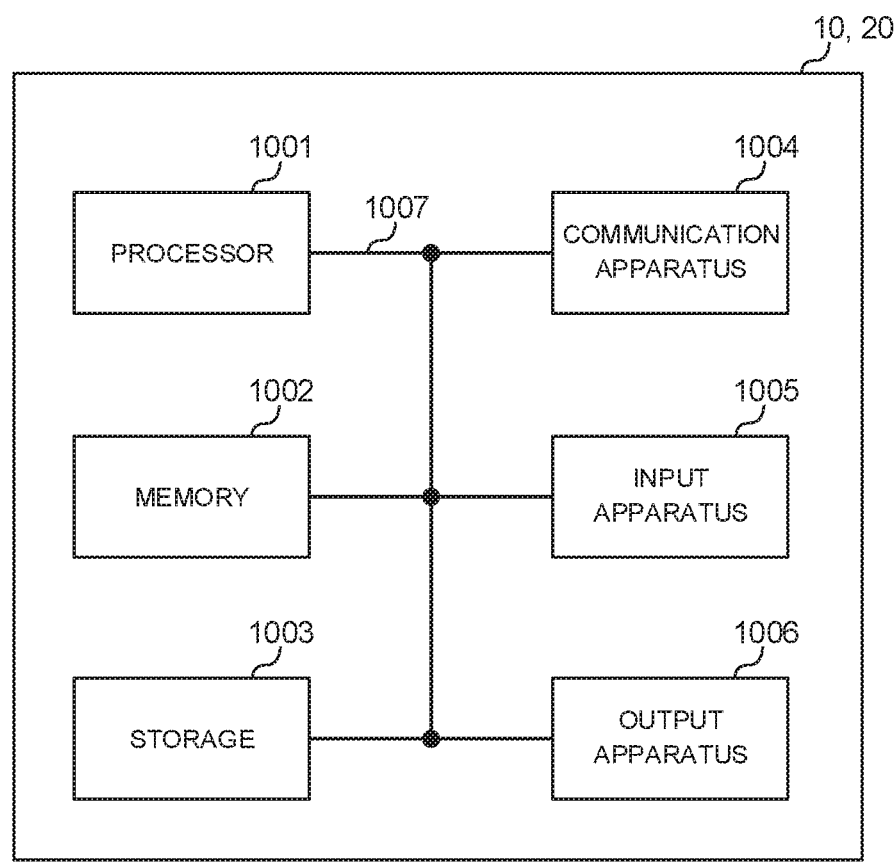
FIG. 10 is a diagram to show an exemplary hardware structure of a radio base station and a user terminal according to one embodiment of the present invention.

For example, the radio base station, user terminals and so on according to one embodiment of the present invention may function as a computer that executes the processes of the radio communication method of the present invention. FIG. 10 is a diagram to show an exemplary hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only 1 processor 1001 is shown, a plurality of processors may be provided.

Furthermore, processes may be implemented with 1 processor, or processes may be implemented in sequence, or in different manners, on one or more processors. Note that the processor 1001 may be implemented with one or more chips.

The functions of the radio base station 10 and the user terminal 20 are implemented by allowing hardware such as the processor 1001 and the memory 1002 to read certain software (programs), thereby allowing the processor 1001 to do calculations, the communication apparatus 1004 to communicate, and the memory 1002 and the storage 1003 to read and/or write data.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules, data and so forth from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving apparatus) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals" (or "signaling"). Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or multiple slots in the time domain. A subframe may be a fixed time duration (for example, 1 ms) not dependent on the numerology.

Furthermore, a slot may be comprised of one or more symbols in the time domain (OFDM (Orthogonal Frequency Division Multiplexing) symbols, SC-TDMA (Single-carrier Frequency Division Multiple Access) symbols, and so on). Also, a slot may be a time unit based on numerology. Also, a slot may include a plurality of mini-slots. Each mini-slot may be comprised of one or more symbols in the time domain. Also, a mini-slot may be referred to as a "subslot."

A radio frame, a subframe, a slot, a mini-slot and a symbol all represent the time unit in signal communication. A radio frame, a subframe, a slot, a mini-slot and a symbol may be each called by other applicable names. For example, 1 subframe may be referred to as a "transmission time interval (TTI)," or a plurality of consecutive subframes may be referred to as a "TTI," or 1 slot or mini-slot may be referred to as a "TTI." That is, a subframe and/or a TTI may be a subframe (1 ms) in existing LTE, may be a shorter period than 1 ms (for example, 1 to 13 symbols), or may be a longer period of time than 1 ms. Note that the unit to represent the TTI may be referred to as a "slot," a "mini slot" and so on, instead of a "subframe."

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this.

The TTI may be the transmission time unit of channel-encoded data packets (transport blocks), code blocks and/or codewords, or may be the unit of processing in scheduling, link adaptation and so on. Note that, when a TTI is given, the period of time (for example, the number of symbols) in which transport blocks, code blocks and/or codewords are actually mapped may, be shorter than the TTI.

Note that, when 1 slot or 1 mini-slot is referred to as a "TTI," one or more TTIs (that is, one or multiple slots or one or more mini-slots) may be the minimum time unit of scheduling. Also, the number of slots (the number of mini-slots) to constitute this minimum time unit of scheduling may be controlled.

A TTI having a time length of 1 ms may be referred to as a "normal TTI (TTI in LTE Rel. 8 to 12)," a "long TTI," a "normal subframe," a "long subframe," and so on. A TTI that is shorter than a normal TTI may be referred to as a "shortened TTI," a "short TTI" "a partial TTI" (or a "fractional TTI"), a "shortened subframe," a "short subframe," a "mini-slot," "a sub-slot" and so on.

Note that a long TTI (for example, a normal TTI, a subframe, etc.) may be replaced with a TTI having a time duration exceeding 1 ins, and a short TTI (for example, a shortened TTI) may be replaced with a TTI having a TTI length less than the TTI length of a long TTI and not less than 1 ms.

A resource block (RB) is the unit of resource allocation in the time domain and the frequency domain, and may include one or a plurality of consecutive subcarriers in the frequency domain. Also, an RB may include one or more symbols in the time domain, and may be 1 slot, 1 mini-slot, 1 subframe or 1 TTI in length. 1 TTI and 1 subframe each may be comprised of one or more resource blocks. Note that one or more RBs may be referred to as a "physical resource block (PRB (Physical RB))," a "subcarrier group (SCG)," a "resource element group (REG)," a "PRB pair," an "RB pair" and so on.

Furthermore, a resource block may be comprised of one or more resource elements (REs). For example, 1 RE may be a radio resource field of 1 subcarrier and 1 symbol.

Note that the structures of radio frames, subframes, slots, mini-slots, symbols and so on described above are merely examples. For example, configurations pertaining to the number of subframes included in a radio frame, the number of slots included in a subframe, the number of mini-slots included in a slot, the number of symbols and RBs included in a slot or a mini-slot, the number of subcarriers included in an RB, the number of symbols in a ITT, the symbol duration, the length of cyclic prefixes (CPs) and so on can be variously changed.

Also, the information and parameters described in this specification may be represented in absolute values or in relative values with respect to certain values, or may be represented using other applicable information. For example, a radio resource may be specified by a certain index.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names; the various names assigned to these individual channels and information elements are in no respect limiting.

The information, signals and/or others described in this specification may, be represented by using a variety of different technologies. For example, data, instructions, commands, information, signals, bits, symbols and chips, all of which may be referenced throughout the herein-contained description, may be represented by voltages, currents, electromagnetic waves; magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, in a memory), or may be managed in a control table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the examples/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBS) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of certain information (for example, reporting of information to the effect that "X holds") does not necessarily have to be sent explicitly, and can be sent in an implicit way (for example, by not reporting this piece of information, by reporting another piece of information, and so on).

Decisions may be made in values represented by 1 bit (0 or 1), may be made in Boolean values that represent true or false, or may be made by comparing numerical values (for example, comparison against a certain value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, 3) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, user terminals 20 may have the functions of the radio base stations 10 described above. In addition, terms such as "uplink" and "downlink" may be interpreted as "side." For example, an "uplink channel" may be interpreted as a "side channel."

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by their upper nodes. In a network comprised of one or more network nodes with base stations, it is clear that various operations that are performed so as to communicate with terminals can be performed by base stations, one or more network nodes (for example, MMEs (Mobility Management Entities), S-GWs (Serving-Gateways) and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The examples/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication systems and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used herein only for convenience, as a method for distinguishing between two or more elements. In this way, reference to the first and second elements does not imply that only 2 elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between 2 elements that are "connected" or "coupled" to each other. The coupling or connection between the elements may be physical, logical or a combination of these. For example, "connection" may be interpreted as "access."

As used herein, when 2 elements are connected, these elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave and optical (both visible and invisible) regions.

In the present specification, the phrase "A and B are different" may mean "A and B are different from each other." The terms such as "leave" "coupled" and the like may be interpreted as well.

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

(Additional Notes)

Now, supplementary notes on the present disclosure will follow below.

<DM (Demodulation)-RS (Reference Signal) Mapping Type for Uplink Frequency Hopping>

«Background»

In NR uplink, frequency hopping is supported to achieve frequency diversity gain.

The detailed mechanism for reporting the first symbol of the preceding (front-loaded (FL)) DM-RS has is not designed yet.

(For example, to align the DM-RS symbol positions with respect to UL (uplink) and DL (downlink), to enable pipeline demodulation, and to improve the reliability of demodulation).

It is beneficial to reserve 2 independent positions for each hop.

Meanwhile, it is also beneficial to reserve 1 common location to reduce the overhead of gNB signaling.

«Proposal»

Independent DM-RS positions are indicated on a per hop basis.

For example, Mapping-type-UL-hop1, Mapping-type-UL-hop 2 (for example, A or B).

For example, UL-DMRS-typeA-pos-hop 1, UL-DMRS-typeA-pos-hop 2 (for example, 2, or 3).

1 gNB signaling is shared for each hop.

For example, Mapping-type-UL (for example, A or B).

For example, UL-DMRS-typeA-pos (for example, 2 or 3).

This application is based on Japanese Patent Application No, 2018-050163, filed on Feb. 28, 2018, including the specification, drawings and abstract, is incorporated herein by reference in its entirety.

The invention claimed is:

1. A terminal comprising:
a transmitter that transmits an uplink shared channel; and
a processor that determines, in response to frequency hopping being applied to the uplink shared channel, a symbol for a demodulation reference signal of the uplink shared channel based on a mapping type of the uplink shared channel by using a start symbol of each hop as a reference point,
wherein in response to the mapping type being type A in which a start symbol of the uplink shared channel is fixed, the processor determines the symbol for the demodulation reference signal based on an index of a first symbol for the demodulation reference signal.

2. The terminal according to claim 1, further comprising a receiver that receives the index of the first symbol for the demodulation reference signal by higher layer signaling.

3. The terminal according to claim 2, wherein in response to the mapping type being type B in which the start symbol of the uplink shared channel is not fixed, an index of a first symbol for the demodulation reference signal is 0.

4. The terminal according to claim 2, wherein the processor determines the symbol for the demodulation reference signal of the uplink shared channel based on a higher layer parameter that indicates a position of an additional demodulation reference signal.

5. The terminal according to claim 1, wherein in response to the mapping type being type B in which a start symbol of the uplink shared channel is not fixed, an index of a first symbol for the demodulation reference signal is 0.

6. The terminal according to claim 5, wherein the processor determines the symbol for the demodulation reference signal of the uplink shared channel based on a higher layer parameter that indicates a position of an additional demodulation reference signal.

7. The terminal according to claim 1, wherein the processor determines the symbol for the demodulation reference signal of the uplink shared channel based on a higher layer parameter that indicates a position of an additional demodulation reference signal.

8. A radio communication method for a terminal, comprising:
   transmitting an uplink shared channel;
   in response to frequency hopping being applied to the uplink shared channel, determining a symbol for a demodulation reference signal of the uplink shared channel based on a mapping type of the uplink shared channel by using a start symbol of each hop as a reference point; and
   in response to the mapping type being type A in which a start symbol of the uplink shared channel is fixed, determining the symbol for the demodulation reference signal based on an index of a first symbol for the demodulation reference signal.

9. A system comprising a terminal and a base station, wherein:
   the terminal comprises:
      a transmitter that transmits an uplink shared channel; and
      a processor that determines, in response to frequency hopping being applied to the uplink shared channel, a symbol for a demodulation reference signal of the uplink shared channel based on a mapping type of the uplink shared channel by using a start symbol of each hop as a reference point,
      wherein in response to the mapping type being type A in which a start symbol of the uplink shared channel is fixed, the processor determines the symbol for the demodulation reference signal based on an index of a first symbol for the demodulation reference signal,
   the base station comprises:
      a receiver that receives the uplink shared channel.

* * * * *